United States Patent
Chenchin et al.

(10) Patent No.: US 6,645,544 B2
(45) Date of Patent: *Nov. 11, 2003

(54) PROCESS FOR PRESERVING FRESH PINEAPPLE

(75) Inventors: Eduardo E. Chenchin, Pukalani, HI (US); William C. Mahin, Pukalani, HI (US); Debra D. Abram, San Francisco, CA (US); Samson T. Hsia, Fremont, CA (US)

(73) Assignee: Maui Pineapple, Ltd., Maui, HI (US)

(*) Notice: Subject to any disclaimer, the term of this patent is extended or adjusted under 35 U.S.C. 154(b) by 14 days.

This patent is subject to a terminal disclaimer.

(21) Appl. No.: 09/919,698

(22) Filed: Jul. 31, 2001

(65) Prior Publication Data

US 2002/0015774 A1 Feb. 7, 2002

Related U.S. Application Data

(60) Continuation-in-part of application No. 09/473,511, filed on Dec. 28, 1999, now abandoned, which is a division of application No. 09/174,068, filed on Oct. 16, 1998, now Pat. No. 6,007,863.

(51) Int. Cl.$^7$ .............................. A23B 7/00; A23L 1/212
(52) U.S. Cl. ........................................ 426/615; 426/639
(58) Field of Search .................................. 426/599, 615, 426/616, 639

(56) References Cited

U.S. PATENT DOCUMENTS

| 127,944 A | 6/1872 | Wood |
|---|---|---|
| 1,305,244 A | 6/1919 | Bacon |
| 2,210,133 A | 8/1940 | Sharma |
| 2,308,486 A | 1/1943 | Bartlett |
| 3,120,441 A | 2/1964 | Asturias |
| 3,398,001 A | 8/1968 | Benson |
| 3,780,641 A | 12/1973 | Hole |
| 3,984,580 A * | 10/1976 | Gur-Arieh et al. .......... 426/639 |
| 4,001,435 A | 1/1977 | Hirao et al. |
| 4,021,585 A | 5/1977 | Svoboda et al. |
| 4,547,381 A | 10/1985 | Mason et al. |
| 4,883,674 A | 11/1989 | Fan |
| 4,895,729 A | 1/1990 | Powrie et al. |
| 4,938,985 A | 7/1990 | Swaine, Jr. et al. |
| 5,244,684 A | 9/1993 | Tong et al. |
| 5,277,922 A | 1/1994 | Rejimbal, Jr. et al. |
| 5,279,843 A | 1/1994 | Zomorodi |
| 5,468,508 A | 11/1995 | Wu et al. |
| 5,614,238 A | 3/1997 | Mendez |
| 5,616,354 A | 4/1997 | Tompkins et al. |
| 5,922,382 A | 7/1999 | Powrie et al. |
| 6,007,863 A * | 12/1999 | Chenchin et al. ....... 426/615 X |

* cited by examiner

*Primary Examiner*—Arthur L. Corbin
(74) *Attorney, Agent, or Firm*—Thomas M. Freiburger

(57) ABSTRACT

A process for treating and storing freshly cut pineapple greatly enhances flavor and increases shelf life. The freshly cut pineapple is first surface-disinfected. Its Brix and acid, and thus Brix/acid ratio, are measured or estimated. Then selection is made from batches of previously stored juice or other liquid medium, which may be pineapple juice from a different season or different part of the same season, or which may be white grape juice, acidified high fructose corn syrup, or blends. The juice or medium is selected to have a Brix/acid ratio which counterbalances that of the fresh fruit, so that the combined fruit/juice has a Brix/acid ratio of around 19. The cut pinapple, preferably chilled to just above freezing, is immersed in the selected juice and is stored and shipped, preferably close to freezing.

17 Claims, 2 Drawing Sheets

PROCESS FOR PRESERVING FRESH PINEAPPLE

This application is a continuation-in-part of application Ser. No. 09/473,511, filed Dec. 28, 1999, now abandoned, which is a division of application Ser. No. 09/174,068, filed Oct. 16, 1998, now U.S. Pat. No. 6,007,863.

BACKGROUND OF THE INVENTION

This invention concerns preservation of freshly cut fruit, both from a microbiological aspect and from the aspect of flavor balance. In particular, the invention is directed at the preservation of flavor and shelf life in freshly cut pineapple.

Fresh fruits have enjoyed increasing popularity in recent times, primarily because of the need for a balanced diet, the health benefits and low calories in fruits, and superior flavor of fresh fruit as compared to canned fruit. In addition, interest in tropical and more exotic fruits has increased.

Fresh pineapple fruit is widely popular, but there are some inconveniences in consumption of pineapple for the average consumer. Whole pineapple is too large for a single serving, is difficult to prepare and involves considerable waste. Approximately 55% to 65% of a whole pineapple can be inedible, including the crown, depending on size of the pineapple.

Like many other ready-to-eat (non-canned) fruits, pineapple fruit as it has currently been offered has several deficiencies. The quality of the fruit is inconsistent due to seasonal variations and growing conditions, discoloration, juice and texture loss. Frequent spoilage of fruit occurs even prior to expiration of a relatively short shelf life. The short shelf life, typically a maximum of about 14 days, causes problems of limited distribution and high cost of air transport rather than surface transport, and occasions high costs due to return of spoiled fruit.

Prior to this invention no effective process has existed for preserving the flavor and balance of fresh fruit, particularly pineapple, while enhancing the shelf life of the fruit considerably beyond 14 days, to the extent that the fruit has a very fresh and acid-balanced flavor upon consumption.

The following U.S. patents have some relevance to various aspects of the process described below: U.S. Pat. Nos. 127,944, 1,305,244, 2,210,133, 2,308,486, 3,120,441, 3,398,001, 4,001,435, 4,021,585, 4,547,381, 4,883,674, 4,895,729, 5,244,684, 5,277,922, 5,279,843, 5,468,508, 5,614,238, 5,616,354, and 6,007,863.

SUMMARY OF THE INVENTION

In accordance with one form of the present invention, a method for maintaining the freshness of freshly cut pineapple fruit includes collecting juice from harvested pineapples, in separate juice batches during a pineapple growing year, the batches varying in Brix/acid ratio, and pasteurizing the juice. On harvesting pineapples, the pineapples are cut and the Brix and acid of the pineapple are determined to thus determine the Brix/acid ratio for the pineapple.

The process then involves selecting juice from at least one previously stored pineapple juice batch, to produce a juice with Brix/acid ratio which will balance the Brix/acid ratio of the newly harvested pineapple, the object being that the pineapple and juice when combined will have a combined Brix/acid ratio in a preselected range. The pineapple juice preferably has been filtered and chilled, freezing as necessary, for storage prior to its selection.

The freshly cut pineapple is treated to reduce surface microflora, and this step can be, for example, dipping in a chlorine solution. In a preferred embodiment the cut pineapple fruit is chilled to 28° (just above freezing) to 45° F. The chilled cut pineapple is then packaged with the selected juice or juice blend, and the pineapple/juice combination is stored in a chilled state, which in one preferred embodiment is just above freezing, e.g. about 28° to 30° F.

The preselected range of combined Brix/acid ratio for the pineapple fruit and juice preferably is about 19, or more generally, in the range of about 16 to 23.

The invention also applies to other fruits in general, the principle being that the freshly cut fruit is immersed in juice which will balance its Brix/acid ratio to a preselected range. Moreover, the juice can be a liquid medium other than juice of the same fruit: juice from a different fruit or blend of different fruits, sweet or tart syrups or other liquid media selected to balance the Brix/acid ratio of the freshly cut fruit as desired. The fruit and juice are not subjected to heat after packaging.

In one particular application, fresh pineapple is immersed and stored in white grape juice. The white grape juice is selected to balance the Brix/acid ratio of the pineapple to a preselected range to allow for optimal flavor and increase the life of the product. White grape juice has been found in many cases even better than pineapple juice in enhancing shelf life and maintaining flavor of fresh pineapple. Though grape juice is used in the industry, typically as a sweetener, or to extend juice in juice blends, or as a medium for fruit cocktails, the use of grape juice to preserve fresh pineapples has not been known and its benefits were not apparent. Grape juice has been used previously as a medium for canned fruit or other shelf stable products. This invention is concerned, however, with fresh, refrigerated produce, a wholly different application achieving a very beneficial and flavorful result.

It is thus a broad object of this invention to preserve the freshness and enhance the acid balance of freshly cut fruit by immersing the cut fruit in juice, syrup or liquid having Brix/acid ratio which will balance that of the fruit, the immersion preserving the fruit and enhancing shelf life as well as preserving and enhancing flavor. A more specific object is to preserve the freshness and shelf life of pineapple in this way, preferably using a balancing medium, preferably white grape juice. These and other objects, advantages and features of the invention will be apparent from the following description of a preferred embodiment, considered along with the accompanying drawings.

DESCRIPTION OF PREFERRED EMBODIMENTS

Figure 1:
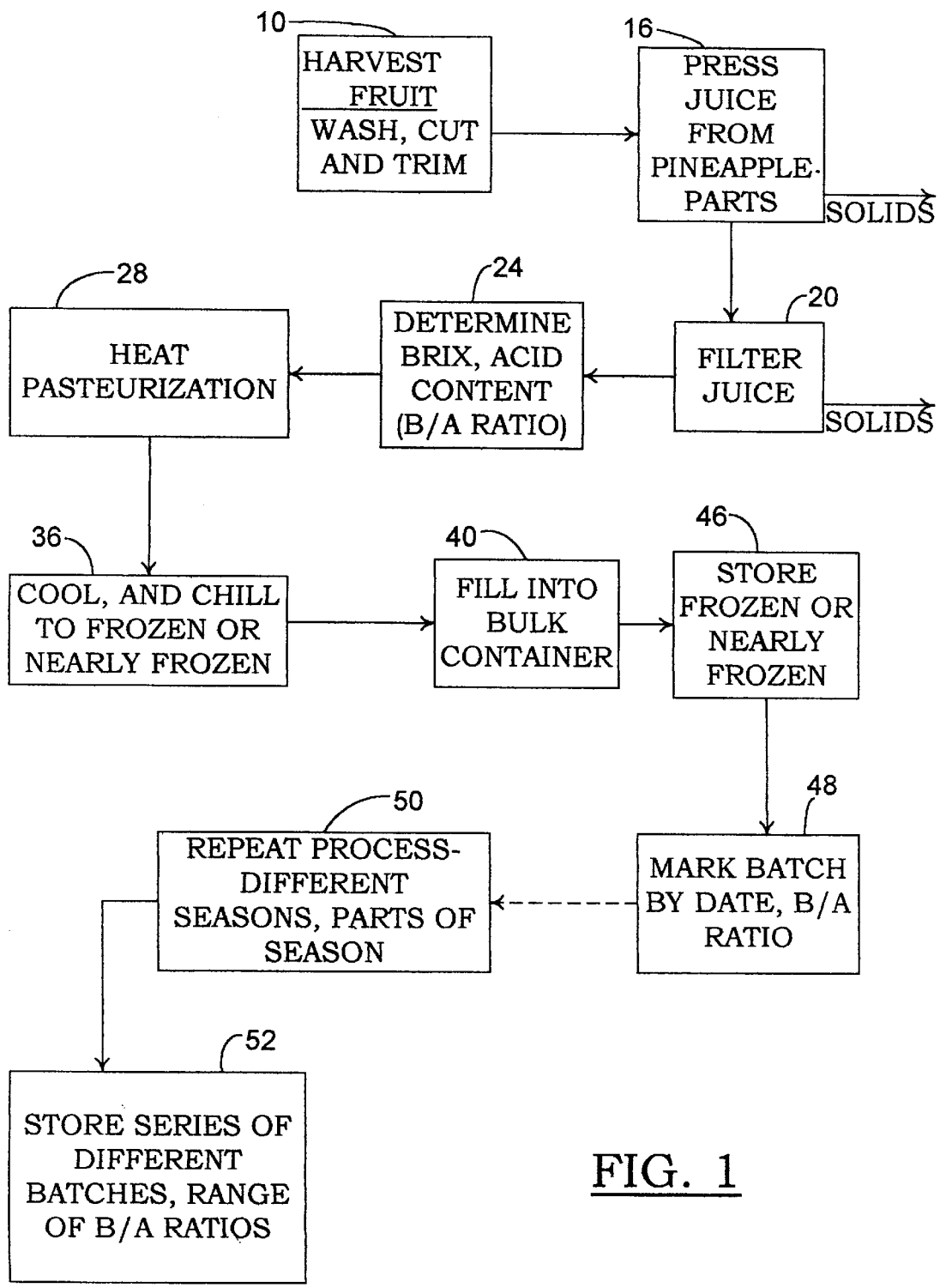
FIG. 1 is a flow chart indicating steps in collecting and preserving juice for use in the process of the invention.

FIG. 1 indicates steps in one preferred embodiment of a portion of the process of the invention, this portion relating to the extraction, processing and storage of juice from fruit, preferably pineapple juice. The box 10 indicates the fruit is harvested and, in the case of pineapple, washed, cut and trimmed. The primary fruit may be used separately, for other products; other pineapple parts from cutting, trimming, coring, etc. can be used for juice. Pineapple parts are pressed, as in the block 16, to recover juice. Insoluble solids are removed and discarded, as indicated.

The juice is then filtered, at 20. At this point, Brix and acid content can be determined in the juice, if this has not been done previously, as indicated at 24.

The clarified juice is heated to pasteurization temperature, at 28. This may be a high temperature short time pasteurization, such as 195° F. for only about one minute, which causes minimal effect on flavor. As is well known, variations are possible in time and temperature.

Next, the clarified and pasteurized juice is cooled at 36, down from the pasteurization temperature, and is filled into bulk storage packaging, at 40, preferably isolated from air. It is then stored in frozen or nearly frozen state, as indicated at the block 46, and the batch of juice is marked by Brix/acid ratio and preferably also by date, at 48. The juice need not be frozen if it is to be used in a short time.

The above process can include addition of acidulent to the juice if needed, such as in pineapple growing regions where the juice may be too low in acid year-round, at least in certain years. The acidulent can help increase shelf life as well as balance B/A ratio in the eventual fruit and juice product. Conversely, the juice can be sweetened if needed. Acidulation or sweetening would preferably be done before storing the juice as above, but could be done later to adjust juice B/A at time of use on fruit. In this description and in the claims, the step of selecting juice from a stored juice batch is intended to include selecting a juice with or without such acid/sweetness adjustment, and the process includes, optionally, making such an adjustment at the time of use of the juice.

This completes the process for a single batch of stored juice, but as indicated in the block 50, the process is repeated, perhaps 8 or 10 or 20 different times within a year, using fruit from different seasons and/or different parts of a season. As noted in the block 52, the end result is that a series of different juice batches are stored, with a range of different Brix/acid ratios, for use in the process of enhancing pineapple fruit, or other fruit.

Figure 2:
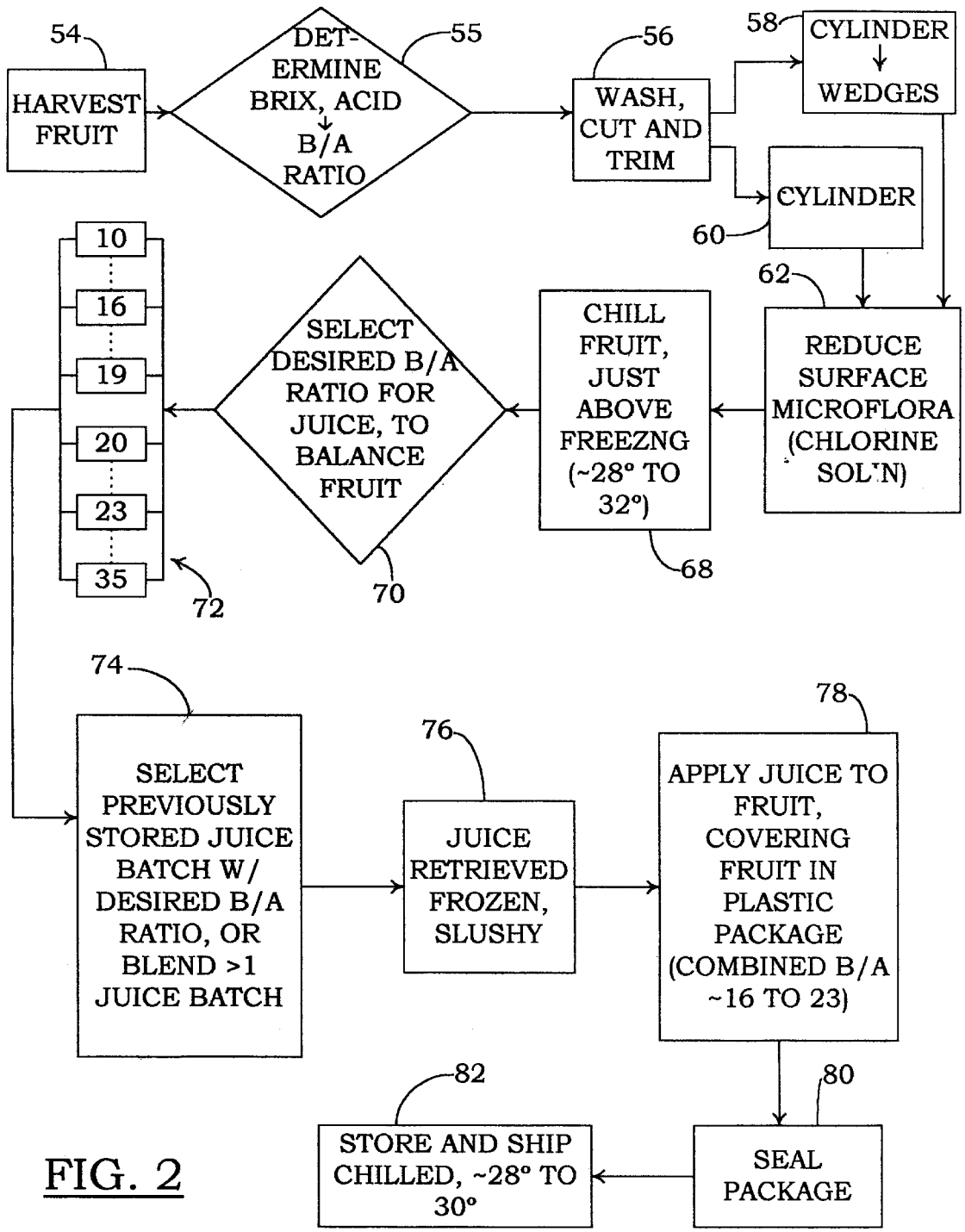
FIG. 2 is a flow chart illustrating major steps in the process of the invention.

The flow chart of FIG. 2 illustrates steps in the process when fresh fruit is harvested and cut, by the method of the invention, resulting in enhanced flavor and shelf life. The illustrated process utilizes the stored juice batches indicated in the flow chart of FIG. 1, but the steps of the process apply to use of other juice or liquid media as well, beginning with the block 20 (filtration and pasteurization may or may not be done). The process is illustrated particularly for pineapple fruit, but most of the steps of the process also are applicable to other fruits.

In FIG. 2 the fruit is harvested at 54. The block 55 indicates determination of Brix and acid content in the freshly cut fruit, which produces a Brix/acid (B/A) ratio. In most cases, the approximate Brix and acid and B/A ratio will be known from the trend of immediately previous harvests. Thus, the determination of Brix and acid does not necessarily mean measurement, in every case. The B/A ratio can be estimated in some cases.

The block 56 indicates that the fruit is washed, cut and trimmed. In the case of pineapple, the skin of the whole fruit is removed, as is the core. The pineapple fruit may be cut into wedges or each pineapple into a cylinder, as indicated at 58 and 60. Even if wedges are the end result, as shown in block 58, the pineapple is first cut into a cylinder, which is cut into wedges. After cutting, a step is taken to reduce surface microflora, i.e. surface disinfection of the cut fruit as by dipping in a chlorine solution. This is indicated in the block 62.

Then, as noted at 68, the cut fruit is chilled, preferably to just above freezing. For pineapples this preferably is a range of about 28° to 32° F. With the B/A ratio of the fruit known, the desired B/A ratio for the juice to be added to the fruit is decided, indicated in the decision block 70 in FIG. 2. The desired target B/A ratio for the combined fruit/juice combination usually is in the range of about 16 to 23; more specifically, a preferred B/A ratio normally is about 19, or in the range 19–20. The B/A ratio of the juice to be added to the fruit must be selected based on the approximate volume ratio of the fruit and juice in the container in which it will be stored and shipped. The relative volumes of fruit and juice are different for pineapple wedges as compared to pineapple cylinders, and thus the B/A of the juice to counterbalance the B/A of the fruit will be different for wedges than for cylinders. This assumes that the B/A ratios of the fruit and juice will equilibrate after a period of immersion, such as a few days, and this has proven to be the case. Formulas for juice B/A selection for a preferred embodiment of the process are described further below.

The collection of blocks 72 in FIG. 2 indicate selection of the desired B/A ratio for the juice (the B/A ratio numbers are not intended to represent a full range of possible selections), while the block 74 signifies selection of the juice itself based on the desired juice ratio. As shown in this block, such selection can include blending more than one juice batch in order to arrive at the desired ratio.

With Hawaii pineapples, the juice B/A ratio generally is lowest from December to April, and highest from June to October, reaching a peak typically in August. In a typical year, the average B/A ratio might vary from about 15 in April to about 23 or 24 in August, for the Champaka variety of the Smooth Cayenne pineapple.

The block 76 indicates that the selected juice batch is retrieved in a frozen or semi-frozen, slushy state. Then, as at 78, the juice is applied to the fruit so as to cover the fruit, and this is preferably done in the plastic package in which the fruit/juice combination will be stored and shipped. The package is sealed (block 80), and stored and shipped chilled, preferably in the range of about 28° to 30° F., as in the block 82. There can be a head space of air in the package, since oxidation will be negligible at this low temperature range.

Table A shows exemplary values for selection of juice B/A for a given pineapple fruit B/A, based on the target combined B/A desired. This is for a pineapple cylinder, for a particular type of packaging which has been successfully employed.

Brix/Acid matrix: Optimum juice Brix/Acid required as a function of the fruit Brix/Acid values: CYLINDER.

| Target B/A ratio | | Juice B/A | | | | | | | | | |
|---|---|---|---|---|---|---|---|---|---|---|---|
| Fruit B/A | | 15.0 | 16.0 | 17.0 | 18.0 | 19.0 | 20.0 | 21.0 | 22.0 | 23.0 | 24.0 |
| 9.0 | | 39.0 | 44.0 | 49.0 | 54.0 | 59.0 | 64.0 | 69.0 | 74.0 | 79.0 | 84.0 |

-continued

| Target B/A ratio | | | | Juice B/A | | | | | | |
|---|---|---|---|---|---|---|---|---|---|---|
| Fruit B/A | 15.0 | 16.0 | 17.0 | 18.0 | 19.0 | 20.0 | 21.0 | 22.0 | 23.0 | 24.0 |
| 10.0 | 35.0 | 40.0 | 45.0 | 50.0 | 55.0 | 60.0 | 65.0 | 70.0 | 75.0 | 80.0 |
| 11.0 | 31.0 | 36.0 | 41.0 | 46.0 | 51.0 | 56.0 | 61.0 | 66.0 | 71.0 | 76.0 |
| 12.0 | 27.0 | 32.0 | 37.0 | 42.0 | 47.0 | 52.0 | 57.0 | 62.0 | 67.0 | 72.0 |
| 13.0 | 23.0 | 28.0 | 33.0 | 38.0 | 43.0 | 48.0 | 53.0 | 58.0 | 63.0 | 68.0 |
| 14.0 | 19.0 | 24.0 | 29.0 | 34.0 | 39.0 | 44.0 | 49.0 | 54.0 | 59.0 | 64.0 |
| 15.0 | 15.0 | 20.0 | 25.0 | 30.0 | 35.0 | 40.0 | 45.0 | 50.0 | 55.0 | 60.0 |
| 16.0 | 11.0 | 16.0 | 21.0 | 26.0 | 31.0 | 36.0 | 41.0 | 46.0 | 51.0 | 56.0 |
| 17.0 | 7.0 | 12.0 | 17.0 | 22.0 | 27.0 | 32.0 | 37.0 | 42.0 | 47.0 | 52.0 |
| 18.0 | 3.0 | 8.0 | 13.0 | 18.0 | 23.0 | 28.0 | 33.0 | 38.0 | 43.0 | 48.0 |
| 19.0 | 0.0 | 4.0 | 9.0 | 14.0 | 19.0 | 24.0 | 29.0 | 34.0 | 39.0 | 44.0 |
| 20.0 | NV | 0.0 | 5.0 | 10.0 | 15.0 | 20.0 | 25.0 | 30.0 | 35.0 | 40.0 |
| 21.0 | NV | NV | 1.0 | 6.0 | 11.0 | 16.0 | 21.0 | 26.0 | 31.0 | 36.0 |
| 22.0 | NV | NV | NV | 2.0 | 7.0 | 12.0 | 17.0 | 22.0 | 27.0 | 32.0 |
| 23.0 | NV | NV | NV | NV | 3.0 | 8.0 | 13.0 | 18.0 | 23.0 | 28.0 |
| 24.0 | NV | NV | NV | NV | NV | 4.0 | 9.0 | 14.0 | 19.0 | 24.0 |
| 25.0 | NV | NV | NV | NV | NV | 0.0 | 5.0 | 10.0 | 15.0 | 20.0 |
| 26.0 | NV | NV | NV | NV | NV | NV | 1.0 | 6.0 | 11.0 | 16.0 |
| 27.0 | NV | NV | NV | NV | NV | NV | NV | 2.0 | 7.0 | 12.0 |
| 28.0 | NV | NV | NV | NV | NV | NV | NV | NV | 3.0 | 8.0 |
| 29.0 | NV | NV | NV | NV | NV | NV | NV | NV | NV | 4.0 |

The table is based on a calculation formula for one specific type of packaging, which relates in a specific volumetric ratio between fruit and juice, as follows: $20X+5Y=25Z$, where $X=B/A$ of the fruit (whole cylinder); $Y=B/A$ of the juice; and $Z$=optimum $B/A$ of the combined fruit/juice product.

Table B is a similar chart of values for the case of pineapple wedges, again in a specific type of packaging.

Brix/Acid matrix: Optimum juice Brix/Acid required as a function of the fruit Brix/Acid values: WEDGES.

| Target B/A ratio | | | | Juice B/A | | | | | | |
|---|---|---|---|---|---|---|---|---|---|---|
| Fruit B/A | 15.0 | 16.0 | 17.0 | 18.0 | 19.0 | 20.0 | 21.0 | 22.0 | 23.0 | 24.0 |
| 9.0 | 25.7 | 28.4 | 31.2 | 34.0 | 36.8 | 39.6 | 42.3 | 45.1 | 47.9 | 50.7 |
| 10.0 | 23.9 | 26.7 | 29.4 | 32.2 | 35.0 | 37.8 | 40.6 | 43.3 | 46.1 | 48.9 |
| 11.0 | 22.1 | 24.9 | 27.7 | 30.4 | 33.2 | 36.0 | 38.8 | 41.6 | 44.3 | 47.1 |
| 12.0 | 20.3 | 23.1 | 25.9 | 28.7 | 31.4 | 34.2 | 37.0 | 39.8 | 42.6 | 45.3 |
| 13.0 | 18.7 | 21.3 | 24.1 | 26.9 | 29.7 | 32.4 | 35.2 | 38.0 | 40.8 | 43.6 |
| 14.0 | 16.8 | 19.6 | 22.3 | 25.1 | 27.9 | 30.6 | 33.4 | 36.2 | 39.0 | 41.8 |
| 15.0 | 15.0 | 17.8 | 20.6 | 23.3 | 26.1 | 28.9 | 31.6 | 34.4 | 37.2 | 39.9 |
| 16.0 | 13.2 | 16.0 | 18.8 | 21.5 | 24.3 | 27.1 | 29.9 | 32.7 | 35.4 | 38.2 |
| 17.0 | 11.4 | 14.2 | 17.0 | 19.8 | 22.6 | 25.3 | 28.1 | 30.8 | 33.7 | 36.4 |
| 18.0 | 9.7 | 12.4 | 15.2 | 18.0 | 20.8 | 23.6 | 26.3 | 29.1 | 31.9 | 34.7 |
| 19.0 | 7.9 | 10.7 | 13.4 | 16.2 | 19.0 | 21.8 | 24.6 | 27.3 | 30.1 | 32.9 |
| 20.0 | 6.1 | 8.9 | 11.7 | 14.4 | 17.2 | 20.0 | 22.8 | 25.6 | 28.3 | 31.1 |
| 21.0 | 4.3 | 7.1 | 9.9 | 12.7 | 15.4 | 18.2 | 21.0 | 23.8 | 26.6 | 29.3 |
| 22.0 | 2.6 | 5.3 | 8.1 | 10.9 | 13.6 | 16.4 | 19.2 | 22.0 | 24.8 | 27.5 |
| 23.0 | 0.8 | 3.6 | 6.3 | 9.1 | 11.9 | 14.7 | 17.4 | 20.2 | 23.0 | 25.8 |
| 24.0 | NV | 1.8 | 4.6 | 7.3 | 10.1 | 12.9 | 15.7 | 18.4 | 21.2 | 24.0 |
| 25.0 | NV | 0.0 | 2.8 | 5.6 | 8.3 | 11.1 | 13.9 | 16.7 | 19.4 | 22.2 |
| 26.0 | NV | NV | 1.0 | 3.8 | 6.6 | 9.3 | 12.1 | 14.9 | 17.7 | 20.4 |
| 27.0 | NV | NV | NV | 2.0 | 4.8 | 7.6 | 10.3 | 13.1 | 15.9 | 18.7 |
| 28.0 | NV | NV | NV | 0.2 | 3.0 | 5.8 | 8.6 | 11.3 | 14.1 | 16.9 |
| 29.0 | NV | NV | NV | NV | 1.2 | 4.0 | 6.8 | 9.6 | 12.3 | 15.1 |
| 30.0 | NV | NV | NV | NV | NV | 2.2 | 5.0 | 7.8 | 10.6 | 13.3 |
| 31.0 | NV | NV | NV | NV | NV | 0.1 | 3.2 | 6.0 | 8.8 | 11.6 |
| 32.0 | NV | NV | NV | NV | NV | NV | 1.4 | 4.2 | 7.0 | 9.8 |
| 33.0 | NV | NV | NV | NV | NV | NV | NV | 2.4 | 5.2 | 8.0 |
| 34.0 | NV | NV | NV | NV | NV | NV | NV | 0.7 | 3.4 | 6.2 |
| 35.0 | NV | NV | NV | NV | NV | NV | NV | NV | 1.7 | 4.4 |
| 36.0 | NV | NV | NV | NV | NV | NV | NV | NV | NV | 2.7 |
| 37.0 | NV | NV | NV | NV | NV | NV | NV | NV | NV | 0.9 |

In this case, for the particular packaging selected, the values are based on the formula $16X+9Y=25Z$.

The following examples describe the use of the process of the invention with freshly cut pineapple.

EXAMPLE 1

Pineapple Wedges in Pineapple Juice

In Maui, Hi., a pineapple field was harvested on Jan. 8, 1998. This was mid-winter fruit, usually very tart. Fruits were washed, skinned, cored, trimmed, and cut into wedges. The cut fruit Brix and acid were measured, and were at 15.0° and 1.0% respectively, thus a Brix/acid (B/A) ratio of 15.0, which gave a tart taste.

A previously treated and stored juice was selected, having a Brix/acid ratio of 26.0, in order to bring the combined fruit/juice B/A ratio to about 19. This juice was from pineapples harvested on Aug. 8, 1997, and had a sweeter character which balanced the more tart character of the fruit.

Immediately after the Aug. 8, 1997 harvest, the expressed pineapple juice was filtered, heat pasteurized, and stored in sanitary containers under freezing conditions. The frozen juice was semi-thawed prior to use.

Cut fruit was dipped in chlorinated water, drained, and chilled.

The fruit, within an hour after cutting and at a chilled temperature of about 30° F., was covered with the juice in packaging consisting of a plastic tub, which is sealed. The fruit was completely immersed in juice, which was partially frozen and slushy. A small head space of air remained above the fruit in the sealed package.

The packaged fruit was stored and transported in coolers at a target temperature range of 28° to 30° F. The packaged fruit was trucked to the market in a refrigerated trailer and then displayed for sale in coolers near the produce section of the market.

The above-described treatment resulted in a fresh, ready to eat pineapple with balanced sweetness and tartness for optimal flavor. It also extended shelf life of the so treated cut pineapple, up to 30 days when properly stored and handled in commerce. On a scale of 1 to 10, with 1 representing the taste of canned pineapple fruit and 10 representing the taste of freshly cut, recently harvested pineapple, the taste of this product was about 7 to 8 on the scale.

EXAMPLE 2

Pineapple Wedges In Pineapple Juice

In Maui, Hi., a pineapple field was harvested on Jul. 29, 1998. This was a very-low acid variety of pineapple, and was summer fruit, usually very sweet. Thus, the Brix/acid ratio was quite high, with a Brix of about 15.6° and an acid content of about 0.6, for a B/A ratio of about 26.0. The fruit had a very sweet taste.

The fruits were washed, skinned, cored, trimmed and cut into wedges.

A previously treated and stored juice was selected, having a B/A ratio of about 15.7, in order to bring the combined fruit/juice B/A ratio to about 22.3, the target in this case. This juice was from pineapples harvested on May 7, 1998, and had a more tart character which balanced the sweeter character of the fruit.

Immediately after the Jul. 29, 1998 harvest, the expressed pineapple juice was filtered, heat pasteurized, and stored in sanitary containers under freezing conditions. The frozen juice was semi-thawed prior to use.

Cut fruit was dipped in chlorinated water, drained, and chilled.

The fruit, within an hour after cutting and at a chilled temperature of about 30° F., was covered with the juice in packaging consisting of a plastic tub, which is sealed. The fruit was completely immersed in juice, which was partially frozen and slushy. A small head space of air remained above the fruit in the sealed package.

The packaged fruit was stored and transported in coolers at a target temperature range of 28° to 30° F. The packaged fruit was trucked to the market in a refrigerated trailer and then displayed for sale in coolers near the produce section of the market.

The above-described treatment resulted in a fresh, ready to eat pineapple with balanced sweetness and tartness for optimal flavor. It also extended shelf life of the so treated cut pineapple, up to 30 days when properly stored and handled in commerce.

EXAMPLE 3

(Hypothetical Example) Pineapple Wedges in Blended Fruit Juice

In Hawaii, a pineapple field was harvested on Mar. 8, 1998. This was late winter fruit, usually tart. Fruits were washed, skinned, cored, trimmed, and cut into wedges. The cut fruit Brix and acid were measured, and were at 12.0 and 1.0%, respectively, thus a Brix/acid (B/A) ratio of 12.0, which gave a tart taste.

A previously treated, stored and blended tropical fruit juice was selected, having a Brix/acid ratio of 31.4, in order to bring the combined fruit/juice B/A ratio to about 19. This blended juice, including juice from passion fruit, pineapple, and guava harvested in the summer months of 1997, had a sweeter character which balanced the more tart character of the fruit.

After harvesting the expressed juices were blended, filtered, heat pasteurized, and stored in sanitary containers under freezing conditions. Frozen juice was semi-thawed prior to use.

Cut fruit was dipped in chlorinated water, drained, and chilled.

The fruit, within an hour after cutting and at a chilled temperature of about 30° F., was covered with the juice in packaging consisting of a plastic tub, a plastic top seal, and a plastic overlap. The fruit was completely immersed in the juice, which was partially frozen and slushy.

The packaged fruit was stored and transported in coolers at a target temperature range of 28 to 30° F. The packaged fruit was trucked to the market in a refrigerated trailer and then displayed for sale in coolers near the produce section of the market.

The above-described treatment resulted in a fresh, ready to eat pineapple with balanced sweetness and tartness for optimal flavor. It also extended shelf life of the so treated cut pineapple in tropical fruit juice, up to 30 days when properly stored and handled in commerce.

EXAMPLE 4

(Hypothetical Example)—Cut Fresh Fruits in Blended Fruit Juice

Fruits including pineapple, papaya, and mango were harvested in April 1998. These were early spring fruits, usually tart. Fruits were washed and skinned. The pineapple was cored, the papaya and mango seeded, then all fruits were trimmed and cut into wedges. The cut fruit Brix and acid were measured, and were averaging at 7.9° and 0.67%, respectively, thus a Brix/acid (B/A) ratio of 11.8, which gave a tart taste.

A previously treated, stored and blended tropical fruit juice was selected, having a Brix/acid ratio of 31.4, in order to bring the combined fruit/juice B/A ratio to about 19. This blended juice, including juice from passion fruit, pineapple, and guava harvested in the summer months, 1997, had a sweeter character which balanced the more tart character of the fruit.

The expressed juices were blended, filtered, heat pasteurized, and stored in sanitary containers under freezing conditions. Frozen juice was semi-thawed prior to use.

Cut fruit was dipped in chlorinated water, drained, and chilled.

The fruit, within an hour after cutting and at a chilled temperature of about 30° F., was covered with the juice in packaging consisting of a plastic tub, a plastic top seal, and a plastic overlap. The fruit was completely immersed in the juice, which was partially frozen and slushy.

The packaged fruit was stored and transported in coolers at a target temperature range of 28 to 30° F. The packaged fruit was trucked to the market in a refrigerated trailer and then displayed for sale in coolers near the produce section of the market.

The above-described treatment resulted in a fresh, ready to eat fruit with balanced sweetness and tartness for optimal flavor. It also extended to shelf life of the so treated cut fruits in fruit juice, up to 30 days when properly stored and handled in commerce.

The following examples describe preserving pineapple fruit in media other than pineapple juice, specifically, high fructose corn syrup in one application, and white grape juice in another. The grape juice can be from concentrate or single-strength. In some cases, the white grape juice was blended with a small amount of pineapple juice. In preferred embodiments the pineapple juice blended into the grape juice may be about 2%. More broadly speaking, the invention when employing white grape juice encompasses using at least about 40% white grape juice as compared to other juices or media, and more preferably at least about 50%. In the most preferred forms of the inventive process in which white grape juice is used, the white grape juice is the primary ingredient of the juice medium, and most preferably substantially all or all of the medium.

EXAMPLE 5

(Hypothetical Example)—Pineapple Wedges in Acidified High Fructose Corn Syrup

In Maui, Hi., a pineapple field was harvested on Jul. 30, 2000. This was mid-summer fruit, usually very sweet. Thus, the Brix/acid ratio was quite high, with a Brix of about 14.0° and an acid content of about 0.5% for a Brix acid ratio of about 28.0. The fruit had a very sweet taste.

The fruits were washed, skinned, cored, trimmed, and cut into wedges.

High fructose corn syrup was previously blended with an acidulent to produce a Brix/acid ratio of about 17.5, in order to bring the combined fruit/juice Brix/acid ratio to about 23.5, the target in this case.

Immediately after blending, the acidified high fructose corn syrup was stored in sanitary containers under near-freezing conditions.

Cut fruit was dipped in chlorinated water, drained, and chilled.

The fruit, within an hour after cutting and at a chilled temperature of about 30° F., was covered with the acidified high fructose corn syrup in packaging consisting of a plastic tub, which is sealed. The fruit was completely immersed in the acidified syrup, which was partially frozen and slushy. A small headspace of air remained above the fruit in the sealed package.

The packaged fruit was stored and transported in coolers at a target temperature range of 28° to 30° F. The packaged fruit was trucked to the market in a refrigerated trailer and then displayed for sale in coolers near the produce section of the market.

The above described treatment resulted in a fresh, ready to eat pineapple with balanced sweetness and tartness for optimal flavor. It also extended shelf life of the so treated cut pineapple, up to thirty days when properly stored and handled in commerce.

EXAMPLE 6

(Hypothetical Example)—Pineapple Wedges in White Grape and Pineapple Juice

In Maui, Hi., a pineapple field was harvested on Jan. 20, 2000. This was a mid-winter fruit, usually very tart. Thus, the Brix/acid ratio was quite low, with a Brix of about 12.0° and an acid content of about 1.0% for a Brix/acid ratio of about 12.0. The fruit had a very tart taste.

The fruits were washed, skinned, cored, trimmed, and cut into wedges.

White grape juice was previously blended with pineapple juice to produce a Brix/acid ratio of about 35.0, in order to bring the combined fruit/juice Brix/acid ratio to about 21.0, the target in this case. The juice blend was about 98% white grape juice.

Immediately after blending, the white grape and pineapple juice mixture was stored in sanitary containers under near-freezing conditions.

Cut fruit was dipped in chlorinated water, drained, and chilled.

The fruit, within an hour after cutting and at a chilled temperature of about 30° F., was covered with white grape and pineapple juice in packaging consisting of a plastic tub, which is sealed. The fruit was completely immersed in the juice which was partially frozen and slushy. A small headspace of air remained above the fruit in the sealed package.

The packaged fruit was stored and transported in coolers at a target temperature range of 28 to 30° F. The packaged fruit was trucked to the market in a refrigerated trailer and then displayed for sale in coolers near the produce section of the market.

The above described treatment resulted in a fresh, ready to eat pineapple, with balanced sweetness and tartness for optimal flavor. Off-flavors found to result when hybrid pineapples are stored in pineapple juice were not present. It also extended the shelf life of the so treated cut pineapple, up to 30 days when properly stored and handled in commerce.

EXAMPLE 6A (Hypothetical Example) Pineapple Wedges in White Grape Juice

In Maui, Hi., a pineapple field was harvested on Jan. 20, 2000. This was a mid-winter fruit, usually very tart. Thus, the Brix/acid ratio was quite low, with a Brix of about 12.0° and an acid content of about 1.0% for a Brix/acid ratio of about 12.0. The fruit had a very tart taste.

The fruits were washed, skinned, cored, trimmed, and cut into wedges.

White grape juice was selected with a Brix/acid ratio of about 35.0, in order to bring the combined fruit juice/Brix acid ratio to about 21.0, the target in this case.

Immediately after blending, the white grape juice was stored in sanitary containers under near-freezing conditions.

The cut fruit was dipped in chlorinated water, drained, and chilled.

The fruit, within an hour after cutting and at a chilled temperature of about 30° F., was covered with white grape juice in packaging consisting of a plastic tub, which is sealed. The fruit was completely immersed in the juice which was partially frozen and slushy. A small headspace of air remained above the fruit in the sealed package.

The packaged fruit was stored and transported in coolers at a target temperature range of 28 to 30° F. The packaged fruit was trucked to the market in a refrigerated trailer and then displayed for sale in coolers near the produce section of the market.

The above describe treatment resulted in a fresh, ready to eat pineapple, with balanced sweetness and tartness for optimal flavor. Off-flavors were not present. It also extended the shelf life of the so treated cut pineapple, up to 30 days when properly stored and handled in commerce.

EXAMPLE 7

(Hypothetical Example) Cut Fresh Fruits in Acidified High Fructose Corn Syrup

Fruits including pineapple, cantaloupe, honeydew melon, and red seedless grapes were harvested on Jun. 30, 2000. These were summer fruits, usually very sweet. Thus the Brix/acid ratio was quite high, with an average Brix of about 11.0° and an average acid content of about 0.3%, for a Brix/acid ratio of about 36.7. The fruit had a very sweet taste.

The pineapples were washed, skinned, cored, trimmed, and cut into wedges. The cantaloupes and honeydew melons were washed, skinned, seeded, trimmed, and cut into wedges. The red seedless grapes were washed and the stems removed.

High fructose corn syrup was previously blended with an acidulent to produce a Brix/acid ratio of about 13.6, in order to bring the combined fruit/juice Brix/acid ratio to about 17.5, the target in this case.

Immediately after blending the acidified high fructose corn syrup was stored in sanitary containers under near-freezing conditions.

The cut fruit was dipped in chlorinated water, drained, and chilled.

The fruit, within an hour after cutting and at a chilled temperature of about 30° F., was covered with the acidified high fructose corn syrup in packaging consisting of a plastic tub, which is sealed. The fruit was completely immersed in the acidified corn syrup, which was partially frozen and slushy. A small headspace of air remained above the fruit in the sealed package.

The packaged fruit was stored and transported in coolers at a target temperature range of 28 to 30°. The packaged fruit was trucked to the market in a refrigerated trailer then displayed for sale in coolers near the produce section of the market.

The above described treatment resulted in a fresh, ready to eat fruit with balanced sweetness and tartness for optimal flavor. It also extended shelf life of the so treated cut fruit, up to 30 days when properly stored and handled in commerce.

EXAMPLE 8

(Hypothetical Example) Cut Fresh Fruits in Acidified White Grape and Pineapple Juice Fruits including pineapple, cantaloupe, honeydew melon, and red seedless grapes were harvested on Dec. 20, 2000. These were winter fruits, usually very tart. Thus the Brix/acid ratio was quite low, with an average Brix of about 10.0° and an average acid content of about 0.8%, for a Brix/acid ratio of about 12.5. The fruit had a very tart taste.

The pineapples were washed, skinned, cored, trimmed, and cut into wedges. The cantaloupes and honeydew melons were washed, skinned, seeded, trimmed, and cut into wedges. The red seedless grapes were washed and the stems removed.

White grape juice was previously blended with pineapple juice and an acidulent to produce a Brix/acid ratio of about 18.7, in order to bring the combined fruit/juice Brix/acid ratio to about 17.0, the target in this case. The blend was primarily white grape juice.

Immediately after blending the acidified juice mixture was stored in sanitary containers under near-freezing conditions.

Cut fruit was dipped in chlorinated water, drained, and chilled.

The fruit, within an hour after cutting and at a chilled temperature of about 30° F., was covered with the acidified white grape and pineapple juice in packaging consisting of a plastic tub, which is sealed. The fruit was completely immersed in the acidified juice mixture, which was partially frozen and slushy. A small headspace of air remained above the fruit in the sealed package.

The packaged fruit was stored and transported in coolers at a target temperature range of 28 to 30°. The packaged fruit was trucked to the market in a refrigerated trailer then displayed for sale in coolers near the produce section of the market.

The above described treatment resulted in a fresh, ready to eat fruit with balanced sweetness and tartness for optimal flavor. It also extended shelf life of the so treated cut fruit, up to 30 days when properly stored and handled in commerce.

EXAMPLE 8A (Hypothetical Example) Cut Fresh Fruits in Acidified White Grape Juice Fruits including pineapple, cantaloupe, honeydew melon, and red seedless grapes were harvested on Dec. 20, 2000. These were winter fruits, usually very tart. Thus the Brix/acid ratio was quite low, with an average Brix of about 10.0° and an average acid content of about 0.8%, for a Brix/acid ratio of about 12.5. The fruit had a very tart taste.

The pineapples were washed, skinned, cored, trimmed, and cut into wedges. The cantaloupes and honeydew melons were washed, skinned, seeded, trimmed, and cut into wedges. The red seedless grapes were washed and the stems removed.

White grape juice was previously blended with an acidulent to produce a Brix/acid ratio of about 18.7, in order to bring the combined fruit/juice Brix/acid ratio to about 17.0, the target in this case.

Immediately after blending, the acidified white grape juice was stored in sanitary containers under near-freezing conditions.

Cut fruit was dipped in chlorinated water, drained, and chilled.

The fruit, within an hour after cutting and at a chilled temperature of about 30° F., was covered with the acidified white grape juice in packaging consisting of a plastic tub, which is sealed. The fruit was completely immersed in the acidified juice, which was partially frozen and slushy. A small headspace of air remained above the fruit in the sealed package.

The packaged fruit was stored an transported in coolers at a target temperature range of 28 to 30°. The packaged fruit was trucked to the market in a refrigerated trailer then displayed for sale in coolers near the produce section of the market.

The above described treatment resulted in a fresh, ready to eat fruit with balanced sweetness and tartness for optimal flavor. It also extended shelf life of the so treated cut fruit, up to 30 days when properly stored and handled in commerce.

The above-described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. A method for maintaining the freshness of freshly cut pinapple fruit, comprising:
   on harvesting a pineapple, cutting the pineapple and determining the Brix and acid of the pineapple thereby determining the Brix/acid ratio for the pineapple,
   selecting white grape juice, from at least one stored white grape juice batch, having a Brix/acid ratio which will substantially balance the Brix/acid ratio of the newly harvested pineapple such that the pineapple and juice, when combined, will have a combined Brix/acid ratio in a preselected range,
   reducing surface microflora on the pineapple,
   immersing the cut pineapple in the selected juice, and then packaging and storing the pineapple/juice combination in a chilled state.

2. The method of claim 1, wherein the cut pineapple fruit is chilled to 28° to 45° F. before being immersed in the juice.

3. The method of claim 1, wherein the white grape juice is pasteurized prior to the immersion step.

4. The method of claim 1, wherein the selected white grape juice is from concentrate.

5. The method of claim 1, wherein the preselected Brix/acid ratio of the combined pineapple fruit and juice is in the range of about 16 to 23.

6. The method of claim 1, wherein the preselected Brix/acid ratio of the combined pineapple fruit and juice is about 19.

7. A method for maintaining the freshness of freshly cut pineapple fruit, comprising:
   on harvesting a pineapple, cutting the pineapple and determining the Brix and acid of the pineapple thereby determining the Brix/acid ratio for the pineapple,
   selecting juice from at least one stored juice batch including at least about 40% white grape juice, to produce a juice medium with a Brix/acid ratio which will substantially balance the Brix/acid ratio of the cut pineapple such that the pineapple and juice, when combined, will have a combined Brix/acid ratio in a preselected range,
   reducing surface microflora on the pineapple,
   immersing the cut pineapple in the selected juice medium, and then packaging and storing the pineapple/juice medium combination in a chilled state.

8. The method of claim 7, wherein the step of selecting juice comprises selecting white grape juice from concentrate.

9. The method of claim 7, wherein the step of selecting juice comprises selecting a blend, including at least about 50% white grape juice.

10. The method of claim 7, wherein the step of selecting juice comprises selecting a blend, including at least about 90% white grape juice.

11. The method of claim 7, wherein the step of selecting juice comprises selecting a blend, including substantially all white grape juice.

12. A method for maintaining the freshness of a mix of freshly cut fruits including at least pineapple fruit and melon fruit, comprising:
   after harvesting, washing, trimming, skinning and cutting the pineapple and melon, mixing the pineapple and melon and determining the Brix and acid of the pineapple and melon fruit mix thereby determining the Brix/acid ratio for the fruit mix,
   selecting juice from at least one stored juice batch, including at least about 40% white grape juice, to produce a juice medium with a Brix/acid ratio which will substantially balance the Brix/acid ratio of the fruit mix such that the pineapple, melon and juice, when combined, will have a combined Brix/acid ratio in a preselected range,
   reducing surface microflora on the fruit,
   immersing the fruit mix in the selected juice medium, and then packaging and storing the fruit mix/juice medium combination in a chilled state.

13. The method of claim 12, wherein the step of selecting juice comprises selecting white grape juice from concentrate.

14. The method of claim 12, wherein the step of selecting juice comprises selecting a blend, including at least about 50% white grape juice.

15. The method of claim 12, wherein the step of selecting juice comprises selecting a blend, including at least about 90% white grape juice.

16. The method of claim 12, wherein the freshly cut fruits include cantaloupe and honeydew melon.

17. The method of claim 16, wherein the freshly cut fruits further include grapes.

* * * * *